US009964361B2

(12) United States Patent
Kalbacher et al.

(10) Patent No.: US 9,964,361 B2
(45) Date of Patent: May 8, 2018

(54) BRAZED PLATE HEAT EXCHANGER WITH A FUNCTIONAL COMPONENT

(71) Applicant: Modine Manufacturing Company, Racine, WI (US)

(72) Inventors: Klaus Kalbacher, Rangendingen (DE); Thomas Bräuning, Stuttgart (DE); Rebecca Weiss, Esslingen (DE)

(73) Assignee: Modine Manufacturing Company, Racine, WI (US)

( * ) Notice: Subject to any disclaimer, the term of this patent is extended or adjusted under 35 U.S.C. 154(b) by 241 days.

(21) Appl. No.: 14/647,494

(22) PCT Filed: Nov. 27, 2013

(86) PCT No.: PCT/US2013/072229
§ 371 (c)(1),
(2) Date: May 27, 2015

(87) PCT Pub. No.: WO2014/085588
PCT Pub. Date: Jun. 5, 2014

(65) Prior Publication Data
US 2015/0300747 A1    Oct. 22, 2015

(30) Foreign Application Priority Data
Nov. 27, 2012 (DE) .......................... 10 2012 023 125

(51) Int. Cl.
*F28F 3/00* (2006.01)
*F28D 9/00* (2006.01)
(Continued)

(52) U.S. Cl.
CPC ................ *F28D 9/00* (2013.01); *B23P 15/26* (2013.01); *F25B 39/04* (2013.01); *F28D 9/005* (2013.01);
(Continued)

(58) Field of Classification Search
CPC .......... F25B 2339/043; F25B 2339/044; F25B 2339/0446; F28F 9/0246; F28D 9/00; F28D 9/0093
See application file for complete search history.

(56) References Cited

U.S. PATENT DOCUMENTS 2,028,458 A *  1/1936  Karmazin ............... F25B 39/04
                                                      165/132
2,691,279 A * 10/1954  Anderson ............... F25B 39/04
                                                      137/315.01
(Continued)

FOREIGN PATENT DOCUMENTS

CN        1983290       6/2007
DE     102011007701    10/2012
(Continued)

OTHER PUBLICATIONS

KR 20110002139 A translation.*
PCT/US2013/072229 International Search Report and Written Opinion dated Apr. 28, 2014 (12 pages).

*Primary Examiner* — Len Tran
*Assistant Examiner* — Jon T Schermerhorn
(74) *Attorney, Agent, or Firm* — Michael Best Friedrich LLP

(57) ABSTRACT

A brazed plate heat exchanger with at least one stack of heat exchanger plates and at least one functional component connected by piping physically and in terms of flow to the stack, for example, a collecting tank, in which case the stack executes a settling movement during brazing. Production is achieved in that the plate heat exchanger with the functional component is produced in a vacuum brazing furnace in a single brazing process, in which at least one structure is contained in the piping that compensates for the settling movement of the plate stack. A corresponding production method is also proposed.

17 Claims, 5 Drawing Sheets

(51) Int. Cl.
  *F28F 9/02* (2006.01)
  *F25B 39/04* (2006.01)
  *B23P 15/26* (2006.01)

(52) U.S. Cl.
  CPC ...... *F28F 9/0246* (2013.01); *F25B 2339/043* (2013.01); *F25B 2339/044* (2013.01); *F28F 2265/26* (2013.01); *F28F 2275/04* (2013.01); *F28F 2280/06* (2013.01)

(56) References Cited

U.S. PATENT DOCUMENTS

| | | | | |
|---|---|---|---|---|
| 5,101,889 | A | | 4/1992 | Potier |
| 5,429,182 | A | * | 7/1995 | Hanafusa ............ F28F 9/002 165/149 |
| 5,509,276 | A | * | 4/1996 | O'Brien ............ B60H 1/3227 165/149 |
| 5,680,897 | A | * | 10/1997 | Kilmer ............ F28D 1/0341 165/153 |
| 5,884,503 | A | * | 3/1999 | Inaba ............ F25B 39/04 62/509 |
| 5,901,573 | A | * | 5/1999 | Kobayashi ........... B60H 1/3229 165/132 |
| 6,512,205 | B1 | | 1/2003 | Evans |
| 7,036,562 | B2 | * | 5/2006 | Ayres ............ F28D 9/0043 165/81 |
| 7,469,554 | B2 | * | 12/2008 | Martins ............ F25B 39/04 165/140 |
| 9,429,367 | B2 | * | 8/2016 | Jouanny ............ F28D 9/005 |
| 2009/0019694 | A1 | | 1/2009 | Zobel et al. |
| 2012/0061052 | A1 | * | 3/2012 | Alessandrelli ........ F24D 11/004 165/67 |
| 2013/0146265 | A1 | * | 6/2013 | Kim ............ F25B 39/04 165/166 |
| 2015/0226469 | A1 | * | 8/2015 | Hofmann ............ F25B 39/04 62/506 |

FOREIGN PATENT DOCUMENTS

| | | | |
|---|---|---|---|
| EP | 2420763 | | 2/2012 |
| FR | 2947041 | | 12/2010 |
| FR | 2947045 | | 12/2010 |
| KR | 20110002139 A | * | 1/2011 |
| WO | 2009065812 | | 5/2009 |
| WO | 2011135650 | | 11/2011 |

* cited by examiner

Before soldering

BRAZED PLATE HEAT EXCHANGER WITH A FUNCTIONAL COMPONENT

CROSS-REFERENCE TO RELATED APPLICATIONS

This application claims priority to German Patent Application No. DE 102012023125.3, filed Nov. 27, 2012, the entire contents of which are hereby incorporated by reference herein.

BACKGROUND

The invention relates to a brazed plate heat exchanger with a stack of heat exchanger plates and at least one functional component physically connected by means of piping and in terms of flow to the stack, like a collecting tank.

The invention also concerns a method for production of such brazed products.

These brazed products, which are made available to automobile manufacturers as a component of air conditioning systems, are being increasingly proposed of late.

The following examples can be mentioned: KR 10 2011 002 139 A, WO2009/065812 A1, FR 2 947 041 A1, FR 2 947 045 A1, EP 2 420 763 A2 and DE 10 2011 007 701 A1.

The plate heat exchanger in the aforementioned examples is a condenser in which a refrigerant is condensed by means of a liquid coolant and temporarily stored in the collecting tank in order to ensure separation of the liquid phase from the gas phase of the refrigerant. The piping serves to direct the refrigerant, which has at least partially flowed through the plate heat exchanger, into the collecting tank and/or from it. In many cases the condenser has a condensation part, say, a separate plate stack or a plate stack section that is intended for condensation of the refrigerant, and a supercooling part, which can be a corresponding different plate stack section or another separate plate stack provided for further supercooling of the refrigerant. The collecting tank can be situated between the condensation part and the supercooling part or also (viewed in terms of flow) after the supercooling part.

The prior art just sketched has already been essentially described previously per se, namely on pages 3, 5 and 7 of DE 19 881 14 T5. The collecting tank is referred to there as a coolant tank integrated in the condenser.

In the references of the prior art the applicants dealt more with variants of physical embodiments of the products than with the question as to how such brazed products can be produced cost-effectively.

However, it was discussed in the aforementioned EP document, paragraph 0016, that the product referred to as a condenser module there is produced in a brazing furnace with a single brazing process. In this reference the condensation part and the supercooling part are situated on a common base plate. The condensation part and the corresponding plates stack extend upward from the top of the base plate and the plate stack of the supercooling part is situated on the bottom of the base plate. The collecting tank stands on a lateral protrusion of the base plate. It is releasably or unreleasably fastened there. According to this reference the piping referred to there as a transfer tube must be subsequently screwed or welded on (paragraph 0021) in order to complete the already brazed condenser module.

SUMMARY

The task of the invention is seen in configuring the product to be brazed and a production method for it so that the manufacturing capability of the product is improved.

As could already be demonstrated by performed experiments, production of such products, including the piping, in a single brazing process and therefore cost-effectively, is made possible by the invention. The inventors recognized that the challenge lies in configuration of the piping and/or its connections to the plate stack and to the functional components, which are therefore stated as proposed.

The functional component is preferably represented by the collecting tank in one embodiment.

However, another component to which the piping is connected can also be involved. For example, the piping could connect a condensation part with a supercooling part of a plate condenser without a collecting tank being present in between.

The mentioned brazing process is preferably conducted in the vacuum brazing furnace in which the products are brazed free of flux. A single brazing process means that the products are finished after first leaving the brazing furnace, and in any case need not be completed, for example, with piping. Performing the brazing process in a CAB brazing furnace, however, is not ruled out.

The product according to the invention, especially its piping, is designed so that settling movements of plate heat exchangers that occur during performance of brazing from melting off of the braze materials are permitted. The quality of the braze joints on the piping is not compromised by this, as could also be established.

The invention also permits performance either of brazing of the pipe ends on the plate heat exchanger and on the collecting tank during one brazing processing, in which the pipe ends are tacked, caulked or similarly fastened before brazing or it also permits complete welding of the mentioned tube ends. The difference relative to the described prior art consists of the fact that these expedients are already performed before performance of the brazing process. Consequently, greater latitude for configuration with respect to the production process, with additional saving potentials, for example, and more favorable adjustment to existing production equipment, is made available to the manufacturing engineer by the invention.

One embodiment of the invention consists of the fact that structures are contained in the piping that compensate for the settling movement of the plate stack, in which the structure consists of at least a pipe bend in the piping having two pipe arms that can be compressed in the direction of the settling movement, in which case the pipe bend is a bend above about 180°, which has roughly two parallel pipe arms whose length is preferably a multiple of the bending radius, in which case formation of the structure also consists of arranging a multiple-part piping with at least two pipe ends inserted one into the other, which can be further pushed together in the direction of the settling movement, the structure also consisting of the fact that the piping has a pipe end that cooperates with a bushing or the like so that the pipe end can be pushed further in the direction of the settling movement or beyond the bushing and in which finally a single brazing process is provided preferably in a vacuum brazing furnace.

It depends on the individual case whether only one or more of the described structures are provided in a single brazed plate heat exchanger. For example, it depends on how strongly the settling movements occur in the individual case and whether their compensation can be achieved with only one of the described structures or not. With increasing number of plates or with an increasing number of channels that are formed by the plates, larger settling movements must be allowed for, which must be compensated by the piping structures proposed here.

The proposed piping structures are to be interpreted as examples.

One structure that compensates for the settling movement is the so-called "soft spot" in the pipe, whose property consists of being soft, i.e., flexible in the direction of the settling movement, for which reason it can be referred to here as "soft spot".

A soft spot can also be a corrugated tube structure, which is arranged at least in one section of the piping.

The invention will be described below in practical examples with references to the appended drawings.

DETAILED DESCRIPTION

In the depicted examples a brazed plate heat exchanger is involved with a collecting tank 3 as functional component, which is used as a condenser and represents a component of an air conditioning system (not shown). An at least mostly already condensed refrigerant is introduced to the collecting tank 3 by means of piping 2 or discharged from it. Gas bubbles still possibly present in the refrigerant collect in a gas space of the collecting tank 3 lying geodetically on the top. Only the liquid refrigerant is withdrawn from the collecting tank 3 and flows further into a known air conditioning loop (not shown), which can be assumed in the depictions. An additional piping possibly required for this purpose, which leads away from the collecting tank 3, however, was not depicted.

In other variants also not shown the refrigerant initially flows from the collecting tank 3 into a supercooling part of the condenser in order to further reduce its temperature and only then into the mentioned air conditioning loop.

Figure 5A:
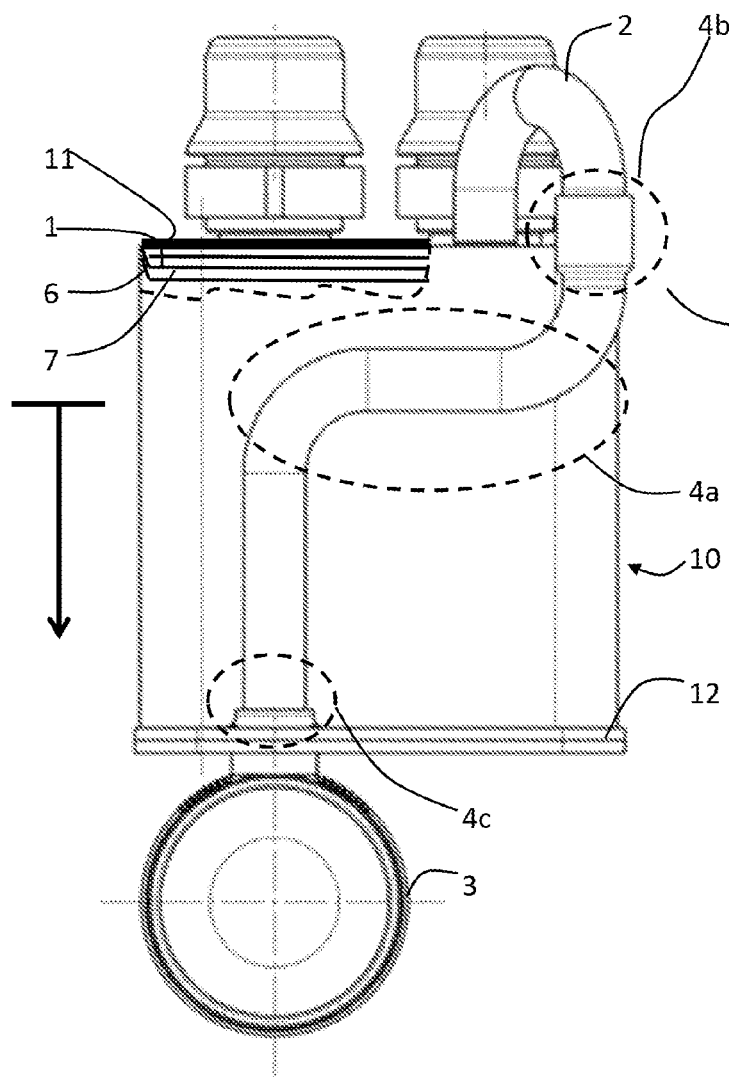
FIGS. 5a and 5b show a combination of several embodiments.

The plate heat exchanger has a stack 10 of heat exchanger plates 1, (see FIG. 5a). The heat exchanger plates 1 have a bent edge 6, on which they are brazed to each other. Flow channels 7 for a liquid coolant and flow channels separate from them for the refrigerant are situated between the heat exchanger plates 1. A cover plate 11 is situated on the top of stack 10 shown in the views, and a base plate 12 on the opposite bottom.

The heat exchanger plates 1, the base plate 12 and cover plate 11 have a correspondingly relatively thin braze coating. All described parts consist of an aluminum alloy.

Two brazed connectors 5 are situated on the cover plate 11 in the practical examples. Refrigerant and/or coolant can be introduced or discharged by means of connectors 5 to and from the mentioned flow channels 7 via channels extending vertically through the stack 10 (not shown).

The plate heat exchangers with the collecting tank 3 and the corresponding piping 2 are preassembled in known fashion, which includes proper preparation (degreasing, etc.) for a brazing process to be conducted afterward. Since the brazing process is conducted in a vacuum brazing furnace (not shown), wetting of the parts with a braze-flux is not required.

The collecting tank 3 in the practical examples has at least one braze connector 30 formed in one piece from the wall of the collecting tank 3 with which it is initially fastened mechanically by caulking or the like to a perforation 9 and base plate 12. The height of the braze connector 30 ensures an expedient distance 31 between the remaining wall of the collecting tank 3 and the base plate 12. In variants not shown the collecting tank 3 is fastened in this way to cover plate 11. The perforation 9 and base plate 12 (or cover plate) has a flange 8, into which one end 42 of piping 2 is inserted in order to produce the flow connection from stack 10 to collecting tank 3 (FIGS. 2 and 4).

Figure 4A:
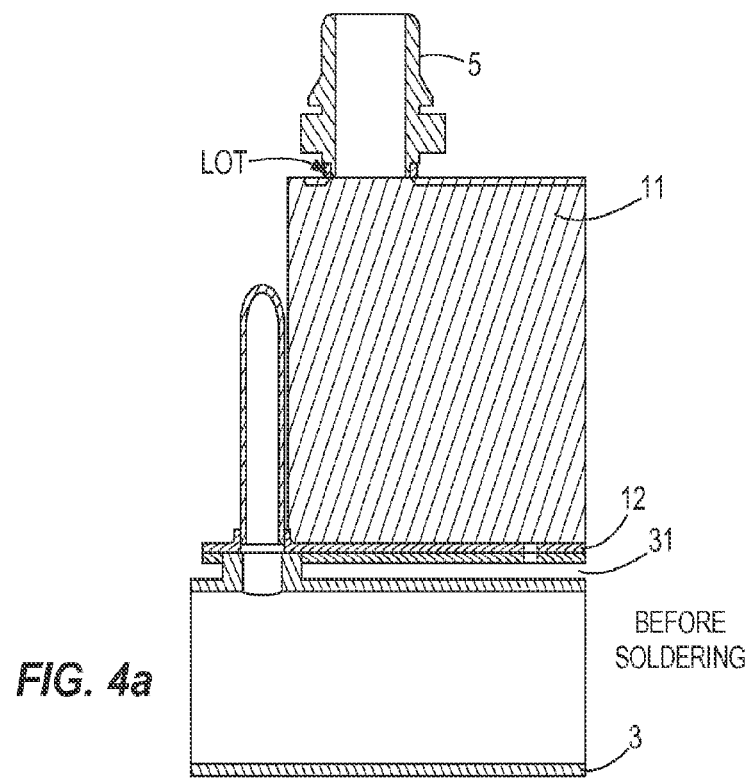
FIGS. 4a and 4b show another embodiment before and after brazing.
Figure 4B:
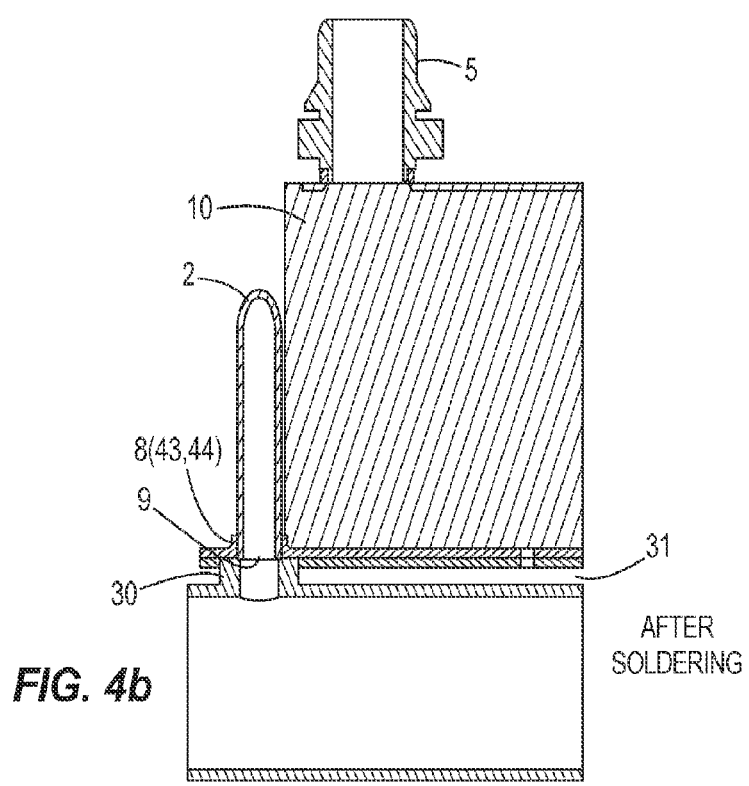

The flange 8 represents a bushing 43 so that a structure 4c is provided that compensates for settling movements during the brazing process, in which the pipe end 42 can be pushed further into bushing 43 in the direction of the settling movement. FIG. 4a shows the assembled state before brazing and FIG. 4b shows that the pipe end 42 after brazing sits somewhat deeper in bushing 43 so that the mentioned compensation is achieved. The mentioned braze connector 30 is supposed to limit the penetration depth of pipe end 42 and therefore represents a stop, as is apparent from FIG. 4b. A braze layer 44 can be situated on the pipe end or on the surface of bushing 43.

The direction of the settling movement was indicated in the figures by an arrow.

Figure 1:
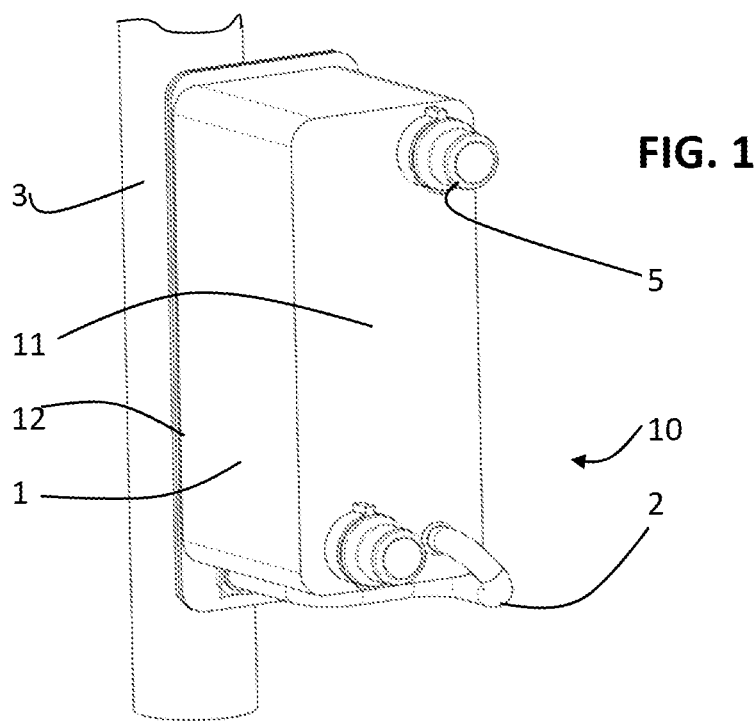
FIG. 1 shows a perspective view of an embodiment of the invention.
Figure 2:
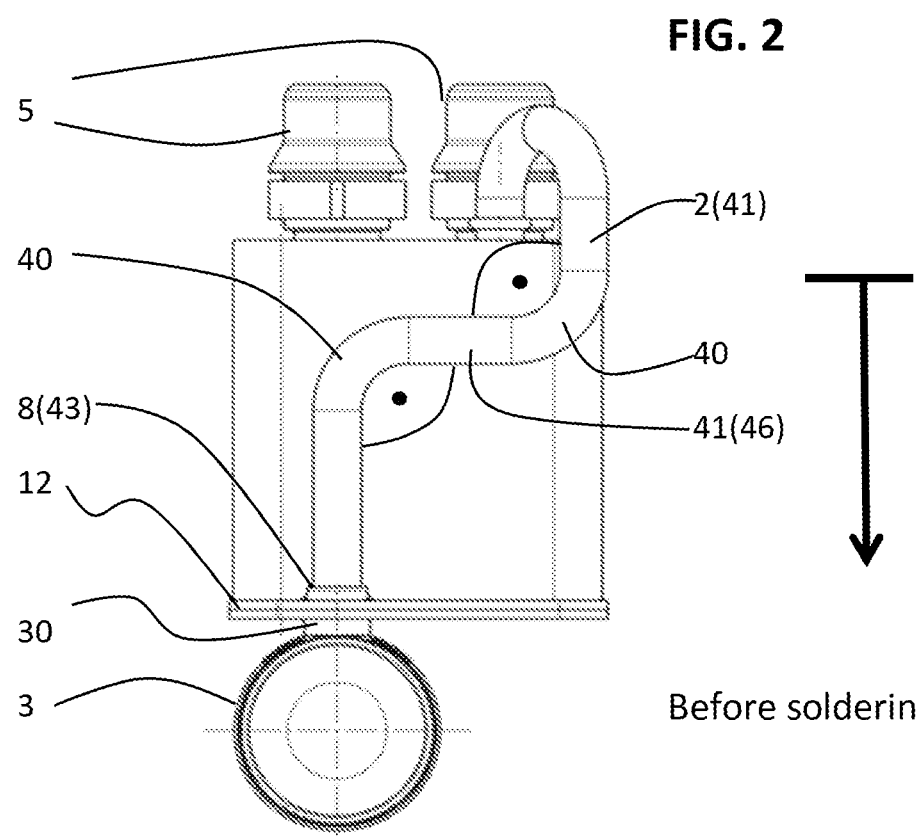
FIG. 2 shows a side view of the embodiment according to FIG. 1.
Figure 3:
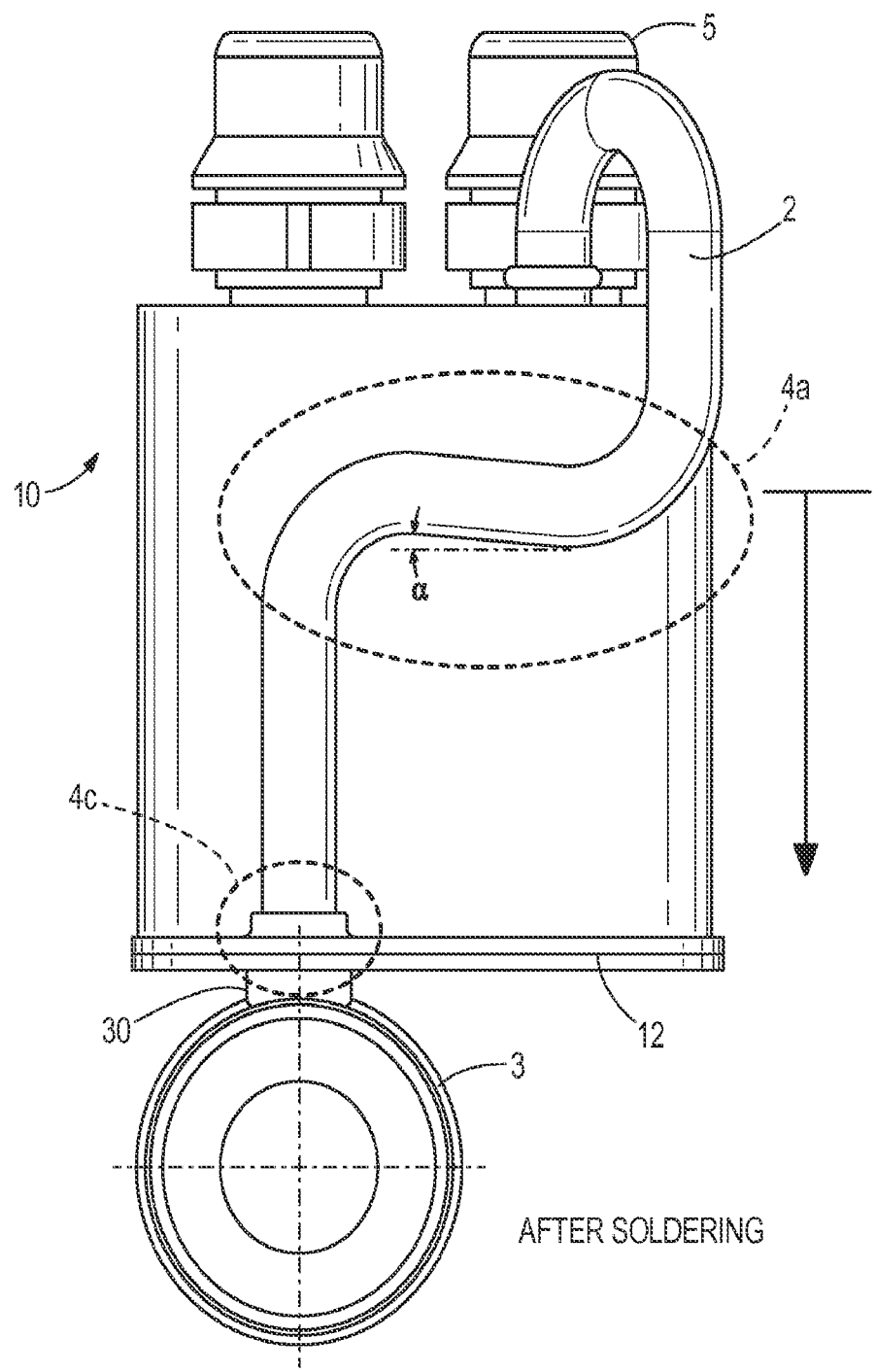
FIG. 3 is like FIG. 2 but in a state after brazing.

In the variant according to FIGS. 2 and 3, two structures, namely the already described structure 4c and another structure 4a, are provided, which is shown by two pipe bends 40 with pipe arms 41 in piping 2. Two 90° pipe bends 40 are involved, as shown in FIG. 2, which depicts the assembled state before brazing. FIG. 3 shows the state after brazing. It is apparent from comparison of FIG. 2 with FIG. 3 that the still roughly horizontal intermediate piece 46 in FIG. 2 of the piping 2 between the two pipe bends 40, which corresponds to one pipe arm 41, has sloped in FIG. 3 by an angle α relative to the horizontal so that compensation of the settling movement is achieved.

Figure 5B:
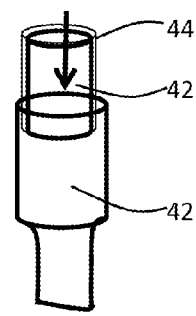

In FIG. 5a another structure 4b was added to the whole, which is clearly shown in FIG. 5b in detail. The piping 2 is then designed in two parts. Two pipe ends 42 are inserted one in the other. An unexpanded pipe end 42, in the practical example the upper end 42 in the figure, has the brazing layer 44, which melts during brazing and ensures the quality of the brazed joint. The upper pipe end or the upper pipe 2 also slides somewhat more deeply into an expanded lower pipe end 42.

Figure 6:
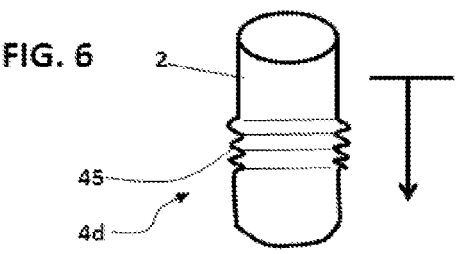
FIG. 6 shows a sketch of another embodiment.

FIG. 6 shows in a sketch another possible structure 4d of the piping 2, which consists of a partial corrugated pipe section 45 and also appears to be suitable for compensating for settling movements.

Figure 7A:
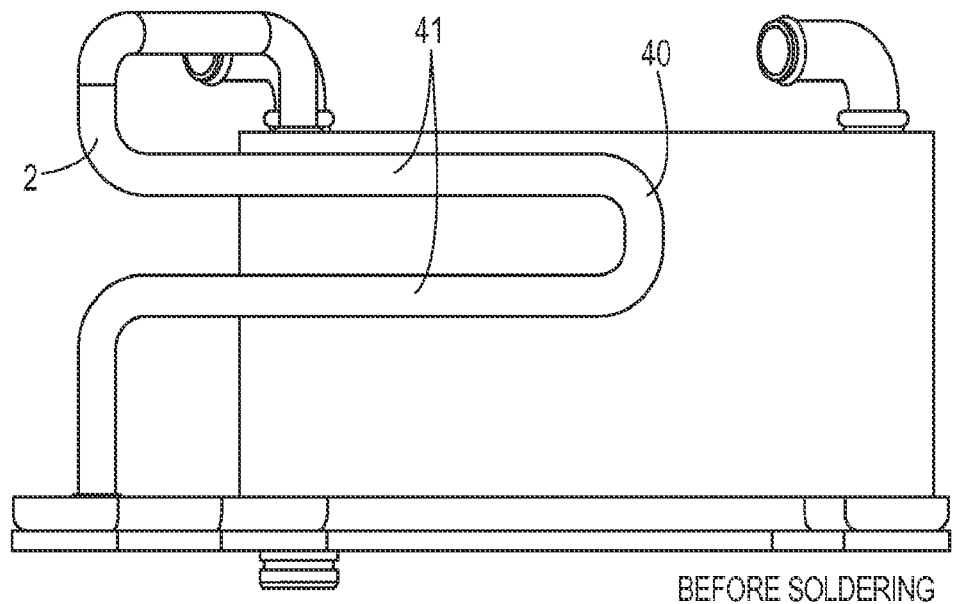
FIGS. 7a and 7b show another embodiment with a soft spot in the piping.
Figure 7B:
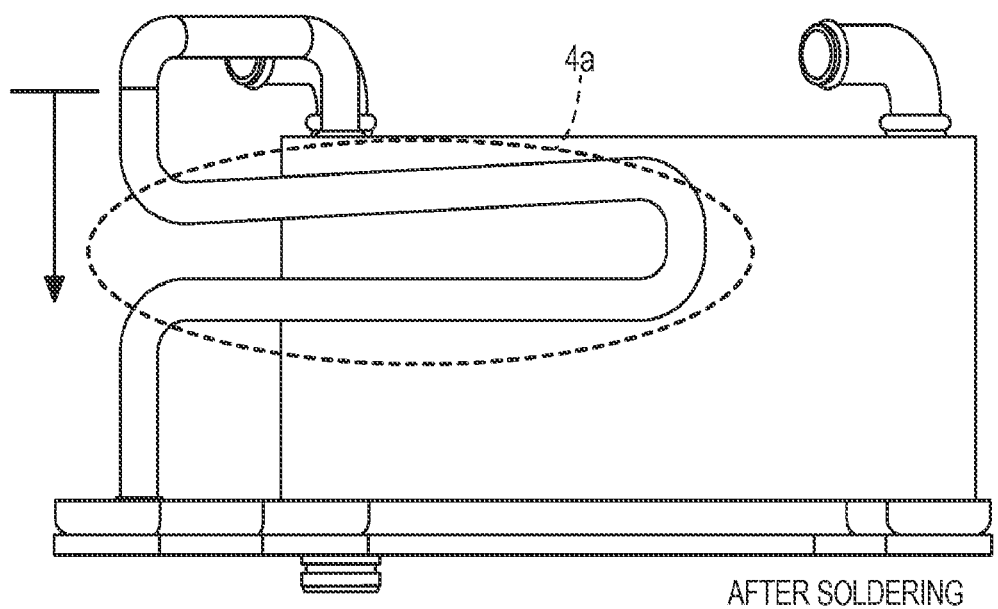

FIGS. 7a and 7b show a 180° tube plate 40 in piping 2, whose arms 41 can be compressed in the direction of the settling movement and therefore compensate it. The length of the arms is much greater than the bending radius. FIG. 7a shows the state before brazing and FIG. 7b after brazing. This structure can also be combined with other structures already described.

The invention with simple means makes available at least one soft spot in the piping 2, which leads to improved braze structure, which can be produced, including piping 2, in a single brazing process, which is preferably conducted in a vacuum brazing furnace.

What is claimed is:

1. A brazed plate heat exchanger comprising: a base plate; a stack of heat exchanger plates extending from a first side of the base plate in a stacking direction; a collecting tank joined to a second side of the base plate opposite the first side by way of at least one braze connector; a perforation extending through the base plate and the at least one braze connector to define a fluid flow path extending between the collecting tank and the first side of the base plate at a first location adjacent to the stack of heat exchanger plates; and piping extending from the first location to a second location at an end of the stack opposite the base plate to direct fluid between the stack and the collecting tank, wherein the base plate, the stack of heat exchanger plates, the collecting tank, and the piping are joined together in a single brazing process; and wherein the piping includes a first linear portion, a second linear portion, a third linear portion, a first flexible bent portion connecting the first and second linear portions, and a second flexible bent portion connecting the second and third linear portions, wherein the flexible bent portions compensate for a settling movement of the stack of heat exchanger plates in the stacking direction during the brazing process.

2. The brazed plate heat exchanger according to claim 1, wherein the second linear portion and the third linear portion extend substantially perpendicular to the stacking direction, and wherein ends of the second and third linear portions furthest from the second bent portion are pushed together during the single brazing process to compensate for the settling movement.

3. The brazed plate heat exchanger according to claim 2, wherein the second bent portion defines a bending radius and wherein the length of each of the second and third linear portions is a multiple of the bending radius.

4. The brazed plate heat exchanger according to claim 1, wherein the base plate includes a flange surrounding the perforation on the first side of the base plate to receive an end of the piping.

5. The brazed plate heat exchanger according to claim 1, wherein the piping includes a first part having a fixed end joined to the base plate at the first location and a second part having a fixed end joined to the end of the stack opposite the base plate at the second location, wherein a free end of one of the first and the second parts is inserted into a free end of the other of the first and second parts to accommodate the settling movement.

6. The brazed plate heat exchanger according to claim 1, wherein the piping comprises a pipe end which cooperates with a bushing so that the pipe end can be pushed further in or over the bushing during the single brazing process.

7. The brazed plate heat exchanger of claim 1, wherein the piping is provided as a single continuous piece.

8. The brazed heat exchanger of claim 1, wherein the piping further comprises a fourth linear portion extending perpendicularly to the base plate from the second location; wherein the first linear portion extends perpendicularly to the base plate from the first location; the third linear portion extends perpendicularly to the base plate and is arranged between the first linear portion and the fourth linear portion; and wherein each of the first, third, and fourth linear portions is offset from the other ones of the first, third, and fourth linear portions.

9. The brazed heat exchanger of claim 8, wherein the piping further comprises a 180° bend.

10. The brazed heat exchanger of claim 1, wherein the piping and the braze connector both extend into the base plate at the first location.

11. The brazed heat exchanger of claim 10, wherein the base plate comprises a first plate providing the first side of the base plate and a second plate providing the second side of the base plate, the first plate having a flange extending outwardly from the base plate at the first location to receive the piping and the second plate having an aperture at the first location to receive the braze connector.

12. The brazed heat exchanger of claim 1, wherein at least one of the linear portions comprises a first end and a second end opposite from the first end, wherein the first end is offset from the second end in a direction perpendicular to the stacking direction.

13. The brazed heat exchanger of claim 1, wherein at least one of the linear portions comprises a first end and a second end opposite from the first end, wherein the at least one linear portion includes a first position before the settling movement and a second position after the settling movement, such that in the first position, the first end is located in a pre-settling position, and in the second position, the first end is located in a post-settling position, which is displaced from the pre-settling position in the stacking direction.

14. A method for producing a brazed plate heat exchanger according to claim 1, the method comprising: forming the stack of heat exchanger plates; mounting the stack to the base plate; mounting the collecting tank to the base plate; brazing the stack of heat exchanger plates, the base plate, and the collecting tank in a brazing furnace, in which case the stack executes the settling movement during brazing; and before brazing, adding the piping, which connects the stack of heat exchanger plates to the collecting tank, whereupon the single brazing process is carried out in the brazing furnace during which the settling movement perpendicular to the plane of the heat exchanger plates is permitted by relative displacement of the piping.

15. The method of claim 14, wherein adding the piping includes adding an at least two-part piping, wherein ends of the piping are pushed one into the other, and wherein the relative displacement of the piping includes relative displacement of the pipe ends.

16. The method of claim 14, wherein the relative displacement of the piping includes the pipe bending to compensate for the settling movement perpendicular to the plane of the heat exchanger plates.

17. The method of claim 14, wherein adding the piping includes connecting an end of the piping to the plate stack or the collecting tank and inserting the piping in or over a bushing, and wherein the settling movement perpendicular to the plane of the heat exchanger plates is permitted by relative displacement of the end of the piping in or over the bushing.

* * * * *